United States Patent [19]

Jiles

[11] Patent Number: 5,654,505

[45] Date of Patent: Aug. 5, 1997

[54] GAS METER CABINET AND UNITARY MANIFOLD

[75] Inventor: Stephen L. Jiles, Anaheim, Calif.

[73] Assignee: Southern California Gas Company, Los Angeles, Calif.

[21] Appl. No.: 321,681

[22] Filed: Oct. 12, 1994

[51] Int. Cl.$^6$ ................................................... G01F 15/14
[52] U.S. Cl. ................................................ 73/201; 285/30
[58] Field of Search ............................... 73/201; 285/30, 285/47; 312/245; 136/861

[56] References Cited

U.S. PATENT DOCUMENTS

| | | | |
|---|---|---|---|
| Re. 31,409 | 10/1983 | Crist | 312/242 |
| D. 219,815 | 2/1971 | Palowsky | D23/40 |
| D. 257,091 | 9/1980 | Crosbie, Sr. | D6/127 |
| D. 301,732 | 6/1989 | Malagrida | D23/263 |
| D. 332,416 | 1/1993 | Craig et al. | D10/99 |
| 1,362,718 | 12/1920 | McNamara . | |
| 1,521,457 | 12/1924 | Lucas et al. | 285/30 |
| 1,883,507 | 10/1932 | Bond et al. . | |
| 2,153,343 | 4/1939 | Ruscher | 285/30 |
| 2,579,656 | 12/1951 | Douglas et al. | 73/201 |
| 2,632,328 | 3/1953 | McChesney | 73/201 |
| 2,690,077 | 9/1954 | Lisenbee | 73/201 |
| 2,881,012 | 4/1959 | Rings | 285/30 |
| 3,111,030 | 11/1963 | Whitman | 73/201 |
| 3,148,690 | 9/1964 | Petersen | 137/15 |
| 3,296,861 | 1/1967 | Mueller et al. | 73/201 |
| 3,301,051 | 1/1967 | Smith | 73/201 |
| 3,444,724 | 5/1969 | Gilpin | 73/40.5 |
| 3,526,419 | 9/1970 | Saguchi | 285/334.1 |
| 3,946,754 | 3/1976 | Cook | 137/315 |
| 3,951,440 | 4/1976 | Dolder | 285/150 |
| 3,970,334 | 7/1976 | Campbell | 73/201 |
| 4,129,192 | 12/1978 | Todeschini et al. | 180/6.48 |
| 4,223,965 | 9/1980 | Palandrani | 312/100 |
| 4,681,380 | 7/1987 | Carlin | 312/242 |
| 4,962,784 | 10/1990 | Collins | 73/201 |
| 5,042,528 | 8/1991 | England | 137/605 |
| 5,315,869 | 5/1994 | Bier et al. | 73/201 |

FOREIGN PATENT DOCUMENTS

| | | |
|---|---|---|
| 3255319 | 11/1991 | Japan . |
| 604855 | 7/1948 | United Kingdom . |

OTHER PUBLICATIONS

Natural Gas Meter Set, Santa Clarita, CA, Circa 1980 (6 Photographs).

*Primary Examiner*—Richard Chilcot
*Assistant Examiner*—Jewel Artis
*Attorney, Agent, or Firm*—Lyon & Lyon LLP

[57] ABSTRACT

A gas meter cabinet is adapted for mounting within a wall of a building. The cabinet has a body partially recessed within the building wall. A perforation at the top of the cabinet accommodates a gas line. A door is coupled to the body. A manifold connects a gas meter to a building gas system. The manifold has a downward facing inlet port, an upward facing outlet port, and a forward facing surface port, above the inlet port. A mounting flange is provided on the manifold for mounting the manifold to a base surface.

24 Claims, 7 Drawing Sheets

GAS METER CABINET AND UNITARY MANIFOLD

BACKGROUND OF THE INVENTION

The invention relates to utility meters. More particularly, it relates to the mounting of natural gas meters at a residence or other building.

In standard mounting of a natural gas meter, the meter is surface mount to the side of a residence or other building. A supply line from the street service typically extends upward out of the ground just in front of the wall to which the meter is mounted. A building line extends out of the wall for connection to the meter. To install the meter, it is plumbed to connect with the building line and supply line. Optionally, it may be additionally secured to the wall by a mounting bracket. The plumbing required for such connection requires a worker to assemble a number of fittings which are typically selected on-site to provide the necessary lengths and angles of plumbing to achieve the proper connection. Additional plumbing must be provided to accommodate any gas powered devices external to the building, for example, a gas-powered pool heater.

Thus the conventional mounting of a gas meter involves much on-site labor by the meter installer as well as producing an exposed myriad of gas plumbing which can yield an unsightly appearance to the building.

It is, therefore, desirable that a meter mounting system be provided which minimizes on-site labor by the meter installer and yields a neat and tidy appearance.

SUMMARY OF THE INVENTION

Accordingly, there is provided in practice of the invention a system which facilitates preforming a meter set within a meter cabinet so that the meter set may be installed as a unit during the construction of a building. The invention provides for a cabinet which may be mounted at least partially recessed within a wall of the building so as to facilitate direct connection to a building gas line running within the wall. The meter may be mounted within the cabinet and placed in communication with the building gas line by a unitarily formed manifold having a downward facing inlet port for connection to an outlet of the meter and an upward facing outlet port located above and behind the inlet port for connection to the building gas line. The manifold, additionally, includes a service port and an accessory port.

BRIEF DESCRIPTION OF THE DRAWINGS

The features of a specific embodiment of the best mode contemplated of carrying out the invention are illustrated in the drawings, in which:

FIG. 2b is a view of the preformed gas meter set to FIG. 1 shown installed in the wall of a building and including an accessory pipe for delivering gas to a remote location with a cabinet door in an open position;

DETAILED DESCRIPTION

Figure 7:
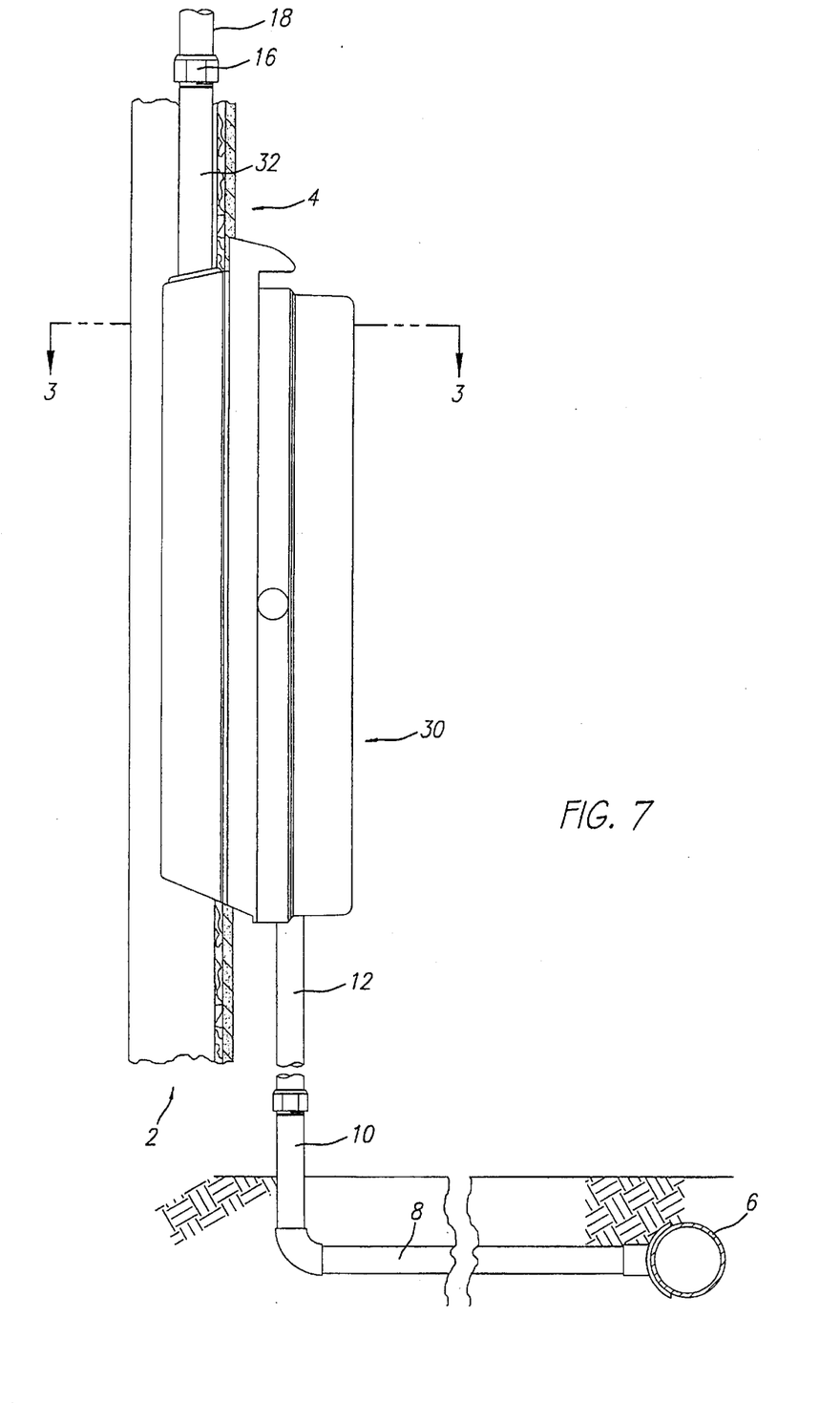
FIG. 7 is a partial cross-sectional view of a building wall showing an installed meter set in side elevation.

With initial reference to FIG. 7, a gas meter set 20 according to principles of the invention is shown mounted partially recessed within an outer wall 2 of a building and projecting from the outer surface 4 of the wall. The meter set receives gas from an underground street main 6 through an underground supply line 8. A riser 10 extends up from the supply line through the ground surface adjacent the outer wall. A connector pipe 12 is connected to the threaded end of the riser via a fitting 14 to complete the inlet line to the meter set.

A head pipe 32 of the meter set extends upward within the wall and is connected by a fitting 16 to a building line or pipe 18 of the building's gas system.

Figure 1:
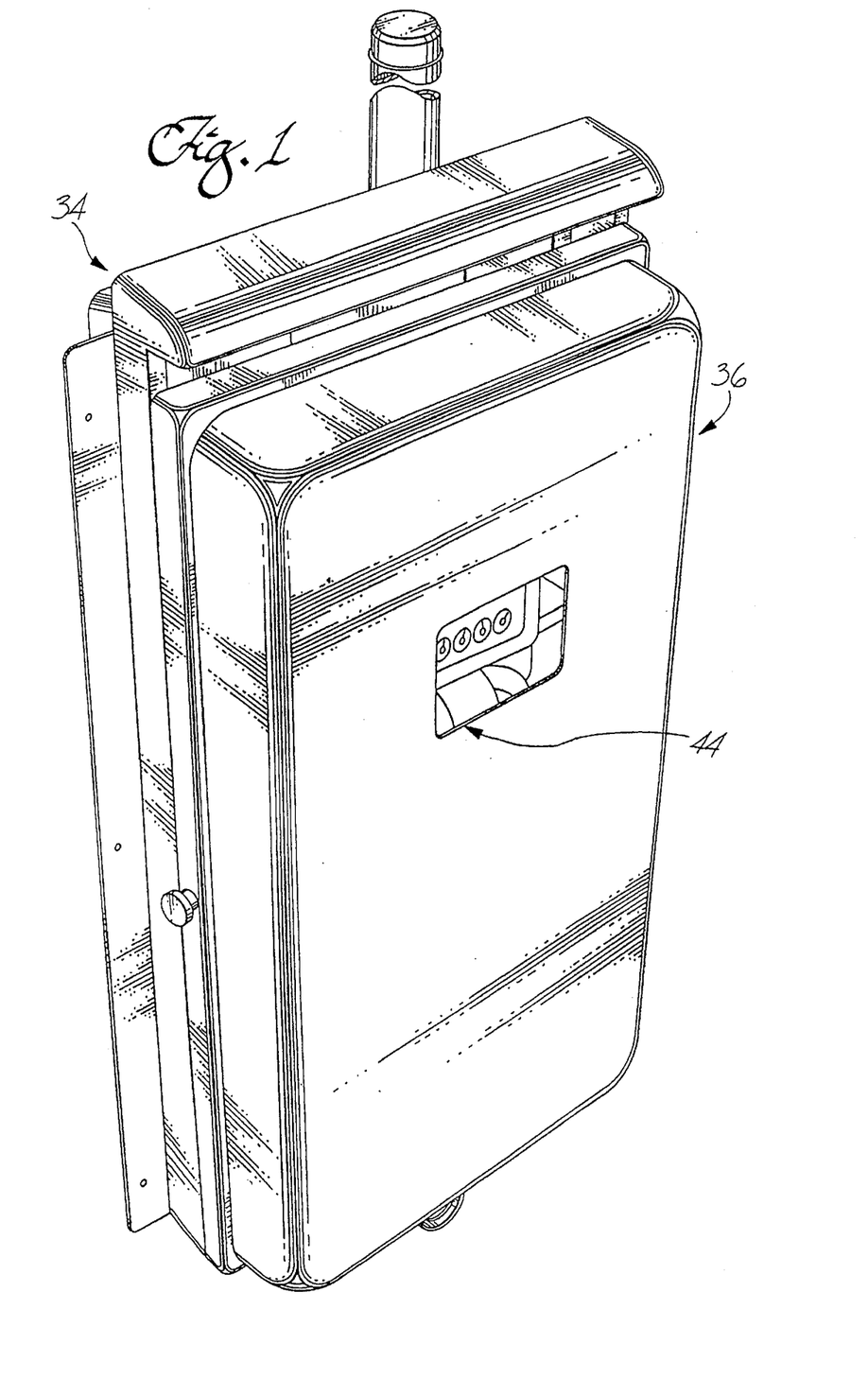
FIG. 1 is a view of a preformed gas meter set with a cabinet door in a closed position.
Figure 2A:
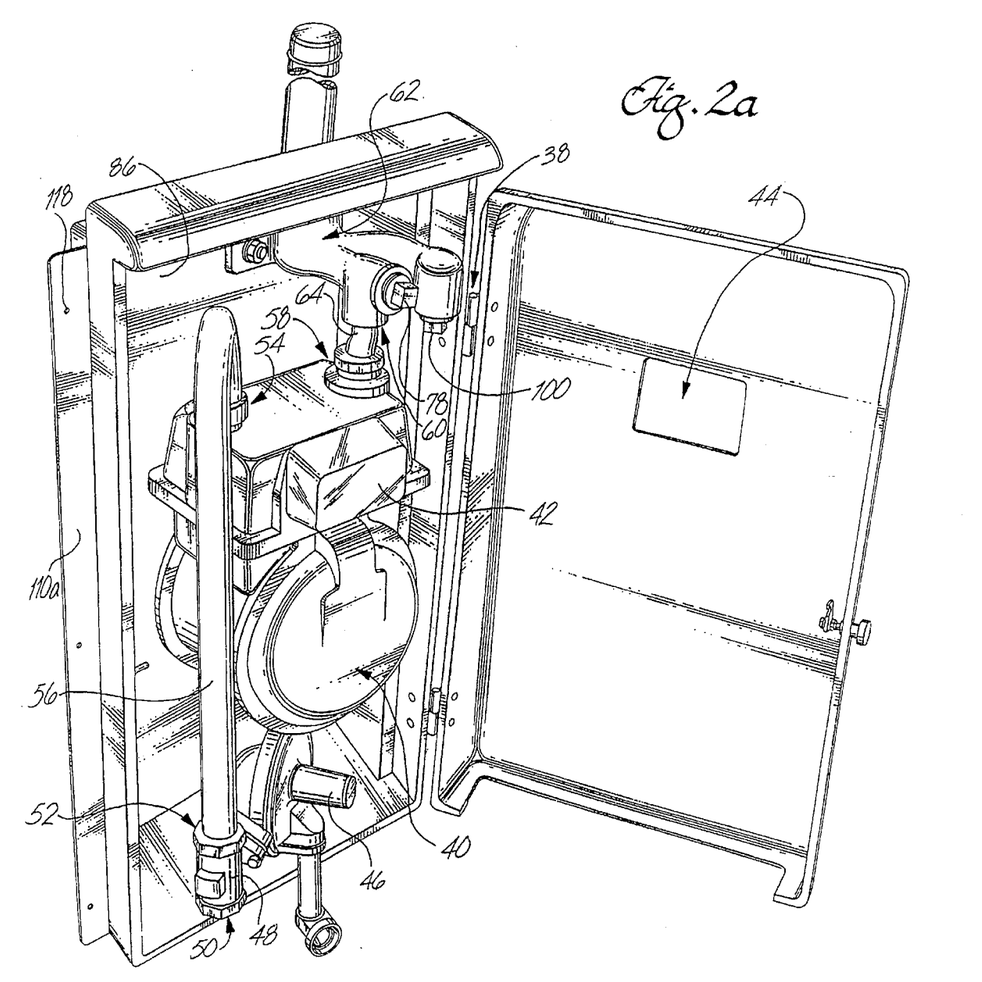
FIG. 2a is a view of the preformed gas meter set of FIG. 1 with a cabinet door in an open position.

With reference to FIGS. 1 and 2a, the meter set may be preformed for installation as a unit during the construction of the building. The meter set includes a cabinet having a body 34 and a door 36. As shown in FIG. 2a, the door is coupled to the body by means of a pair of upper and lower hinges 38 along the left side of the body (from the part of view of the meter set facing outward from the yielding). By the hinges, the door is selectively movable between a closed position of FIG. 1 covering the opening at the front of the body and an open position of FIG. 2a exposing the contents of the cabinet.

As shown in FIG. 2a, the cabinet contains a meter 40 which may be of any appropriate brand and model, an exemplary meter being the model 400A by Schlumberger. The meter has an index 42 which is aligned with a viewing port 44 formed in the door 36 when the door is in the closed position of FIG. 1. In this closed position, the index may be viewed through the viewing port for easy reading of the meter. The meter set additionally includes a pressure regulator 46 having a tee 48 which has an inlet 50 and an outlet 52 which is connected to an inlet 54 of the meter via a J-tube 56. An exemplary pressure regulator is the model S102Y by Fisher Controls. The meter has an outlet 58 which is connected to a downward facing inlet port 60 of a manifold 62 by an offset pipe 64.

Figure 4:
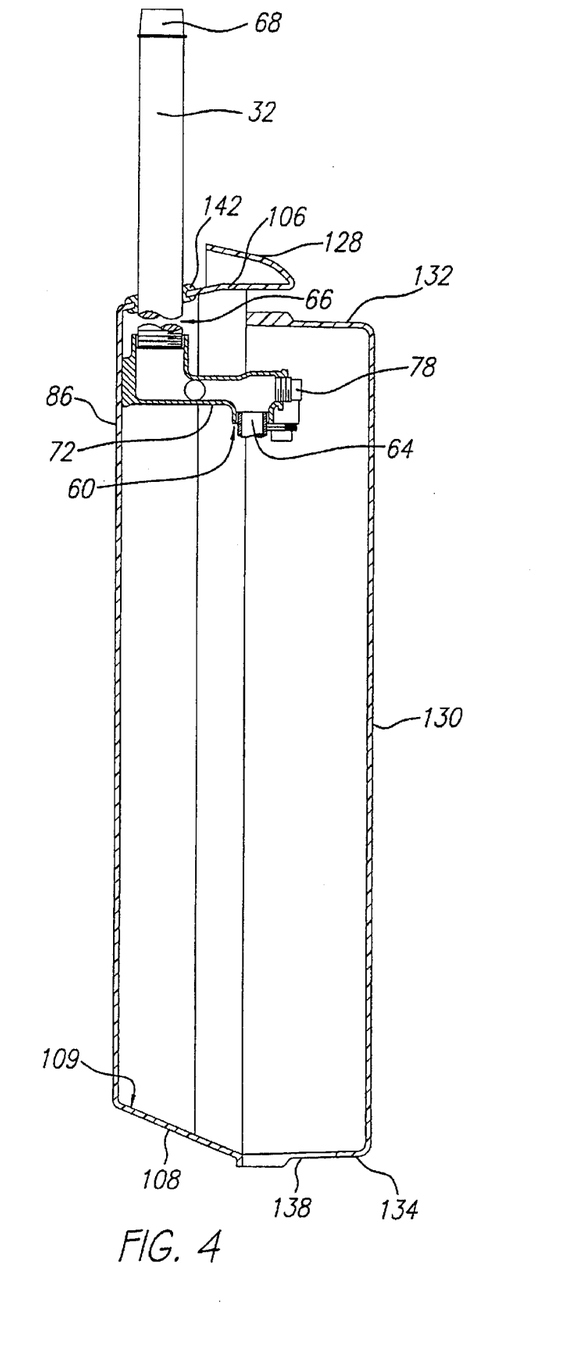
FIG. 4 is a partial side cross-sectional view of the meter set of FIG. 1 taken along line 4—4.
Figure 5:
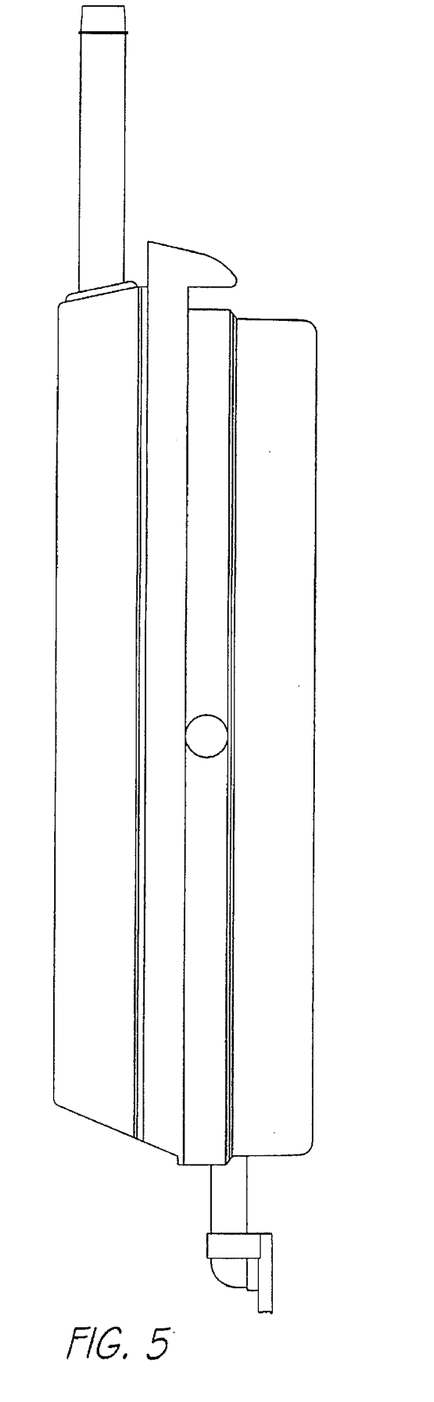
FIG. 5 is a side elevational view of the meter set of FIG. 1.

As shown in the sectional view of FIG. 4, the manifold has an upward facing outlet port 66 into which the lower end of the head pipe 32 is threaded. The threaded upper end of the head pipe is covered by a cap 68 attached during manufacture of the meter set and removed upon installation in the building to allow the head pipe to be connected to the building gas system.

In the preferred embodiment, the manifold 62 is formed as a unitary aluminum casting. The detailed construction of the manifold is described with reference to FIG. 6. The internally threaded inlet and outlet ports 60 and 66 are formed in respective inlet and outlet sections 68 and 70 of the manifold. These sections and thus the ports are connected to each other by a run 72 which provides an offset between the inlet and outlet ports, the outlet port being located above behind the inlet port. The offset permits connection to a building gas line running vertically within the building wall while the meter lies only partially behind the outer surface of the wall.

Figure 6:
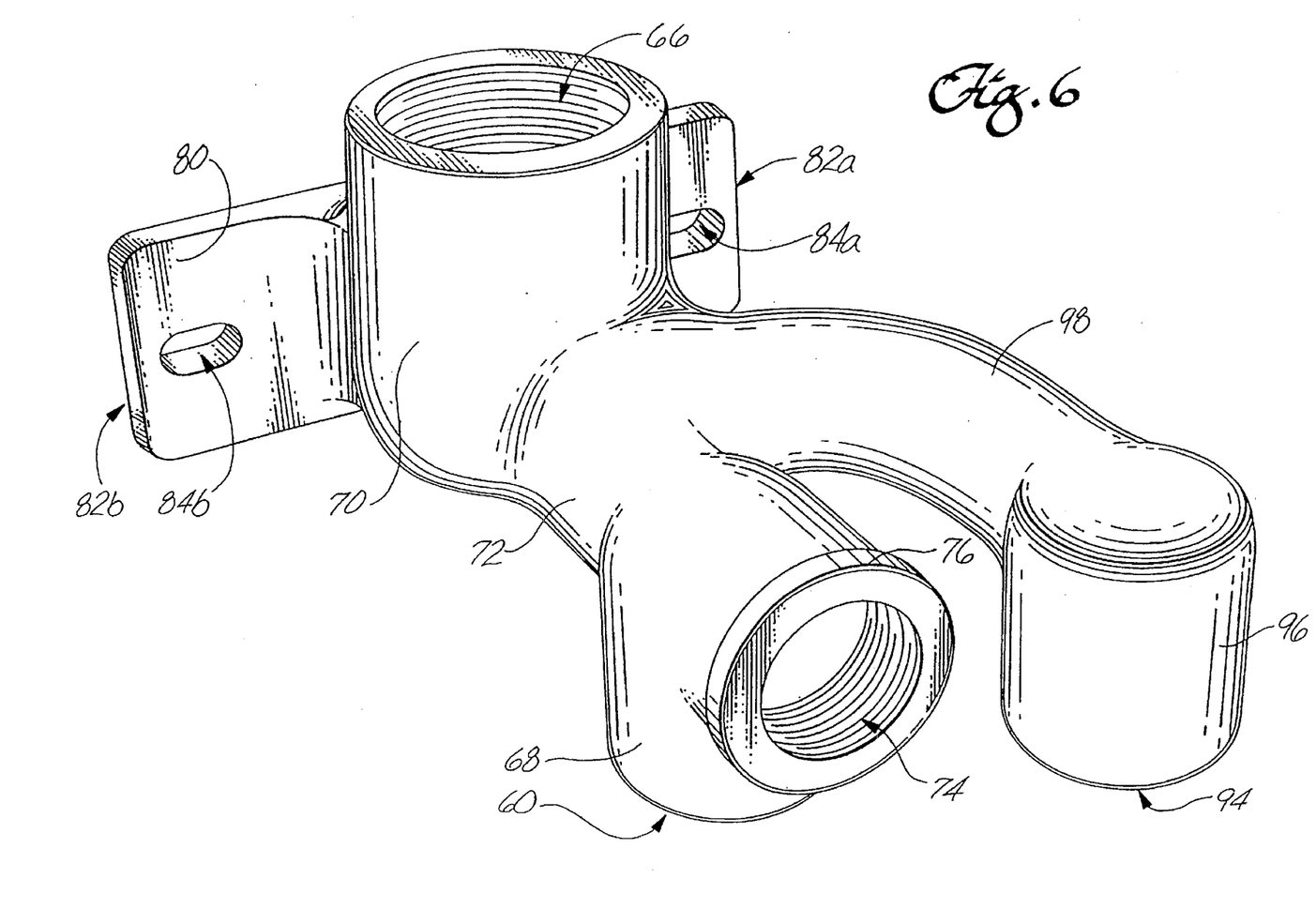
FIG. 6 is a view of a manifold of the meter set of FIG. 1.

Formed in the inlet section and facing forward just above the inlet port 60 is an internally threaded service port 74.

Under normal operating conditions, the service port 74 is sealed by a threaded plug 78 (FIGS. 2a and 4). The service port facilitates a bypassing of the meter during servicing of the meter or its associated equipment. This is done by removing the plug 78 and inserting a probe (not shown) through the service port so as to form a sealing relationship with the run and thereby block the inlet port. Gas is then delivered through the probe to the building gas system, permitting the gas flow through the meter to be stopped without disrupting flow to the building gas system. The use of such probes is well known and one such probe and its method of use are shown in U.S. Pat. No. 3,148,690, by A. D. Petersen, the disclosure of which is incorporated herein by reference. To further facilitate the use of the conventional probe system, the manifold is formed with an annular radially outwardly projecting lip 76 about the inlet port 74. The lip serves to retain a bladder or bag encompassing the probe for preventing the escape of gas.

Figure 3:
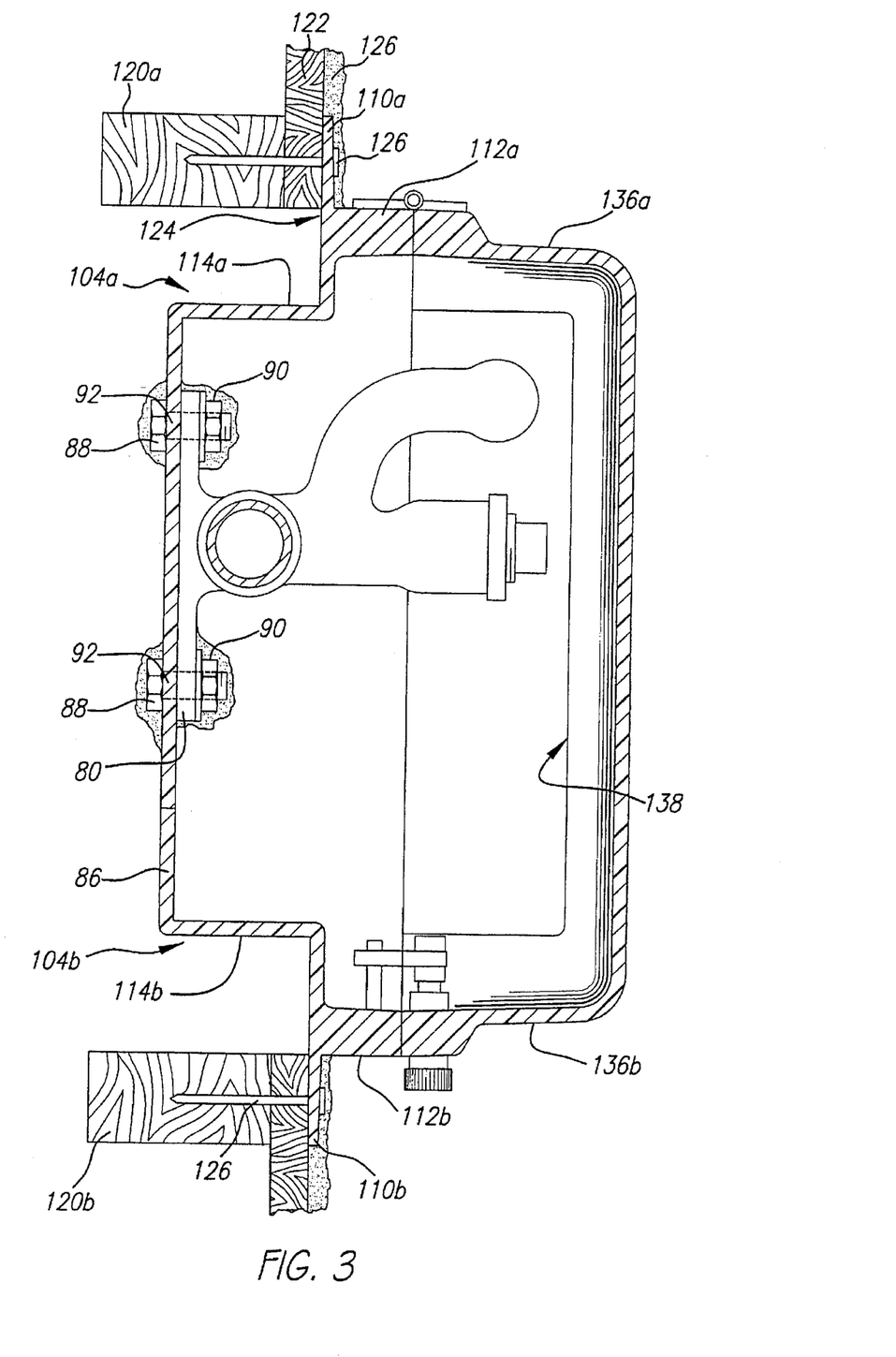
FIG. 3 is a partial horizontal cross-sectional view of the installed cabinet of the meter set of FIG. 7, taken along line 3—3, with the meter and regulator removed to reveal features of the cabinet.

The manifold additionally includes a mounting feature in the form of an elongated, substantially rectangular mounting flange 80 joined to the outlet section 70 and facing rearward therefrom just below the outlet port 66. Adjacent its left and right ends 82a and 82b, respectively, the flange 80 has elongate left and right mounting holes 84a and 84b. The flange is mounted to an appropriate base surface, such as the rear (back) wall 86 of the cabinet body (FIG. 3). Specifically, as shown in FIG. 3, the flat rear surface of the flange 80 is placed on the front surface of the rear wall and secured via bolts 88 and nuts 90 through holes 84a and 84b in the flange and corresponding meter mounting holes or in the rear wall. A sealant, such as a silicone sealant, is applied between the flange and rear wall and additionally, over the bolt heads so as to seal the meter mounting holes 92. It is, thus, seen that the flange 80 supports the manifold and thus the meter, reducing or eliminating any need for a separate meter mounting bracket.

Optionally, the manifold includes an accessory port 94 for providing gas to an accessory or other destination outside of the building. Common accessories are pool and sauna heaters. In the illustrated embodiment, the downward facing accessory port is formed in an accessory port section 96 and is connected to the run 72 by means of a branch 98. In the illustrated embodiment, the accessory port is at the same level as the inlet port 60 but located slightly in front and to the left thereof. As shown in FIG. 2a, the accessory port is initially sealed by a threaded plug 100. Upon installation of the meter set, if there is an accessory to be connected to the gas supply, as shown in FIG. 2b, the plug is removed and replaced with an accessory pipe 102 extending straight down from the accessory port. It is, accordingly, seen that the position of the accessory port relative to the flange is chosen so that the accessory pipe will pass just in front of the forward edge of the bottom wall 108 (FIG. 2b) of the cabinet body.

The detailed construction of the cabinet is now described with primary reference to the cross-sectional views of FIGS. 3 and 4. Although the cabinet may be constructed from a variety of materials and in a variety of ways, it is preferably constructed of a corrosion resistant and nonconductive material and in such a way that the body is gas tight so as to prevent any gas from seeping into the building. Accordingly, the preferred construction is of a molded plastic such as ABS. Fiberglass and other composite structures are also possible. Extending forward from the rear wall 86 are left and right side walls 104a and 104b (FIG. 3) and top and bottom walls 106 and 108, respectively (FIG. 4). The walls are interconnected in a gas tight manner such that the portion of the cabinet to be recessed within the wall permits no flow of gas into the wall. Left and right vertical mounting flanges 110a and 110b, respectively, extend laterally outward from the left and right walls and define a cabinet mounting plane at their rear faces respectively. These flanges extend from a central region of the respective walls with a forward portion 112a, 112b of each wall extending forward of the mounting flange 110a, 110b and located laterally outward of a rear portion 114a, 114b extending rearward from the corresponding mounting flange to the rear wall 86.

As shown in FIG. 2a, each flange 110 bears a plurality of holes 118 for fastening the cabinet to the building. In particular, as further shown in FIG. 3, the meter fits between an adjacent pair of left and right studs 120a and 120b, respectively, in the building wall. In the illustrated building construction, the studs are, by example, 2×4 dimensional lumber, with a layer of ½-inch plywood 122 secured to their outside edges to form a base wall of the building. A window 124 is cut in the plywood between the studs to accommodate the cabinet. The cabinet is placed within the window so that the rear faces of the flanges 110 are in contact with the plywood 122 and the holes 118 are aligned with the studs 120. The cabinet is secured to the studs by means of nails 126 through holes 118. A covering may then be applied over the plywood and the outer surfaces of the flanges to form the outer wall surface. By way of example, this covering may comprise a layer of textured surfacing such as stucco 126 although clipboards or other siding material may also be used.

As is shown in FIG. 4, the bottom 108 (or most importantly, its inner surface 109) slopes downward from the back 86 at approximately a 30° angle. This slope prevents any moisture from pooling at the bottom of the cabinet and, additionally, prevents the cabinet from being used for storing any objects. The latter is desirable as the possibility exists that if metal objects were stored loose within the cabinet, during an earthquake the motion could cause sparks upon metal-to-metal contact. Additionally, the forward portion of the top 106 is turned up and back and extends forward, beyond the forward edges of the sides and bottom and at least partially above the door. Thus, it provides a downward sloping canopy portion 128 extending forward of the mounting flanges for directing any rain water or the like away from the inside of the cabinet.

The door itself is formed with a front wall 130, top and bottom walls 132 and 134, respectively (FIG. 4) and left and right side walls 136a and 136b, respectively (FIG. 3). The top 132 slopes downward to the front so as to divert water (including that falling from the canopy 128) away from the interior of the cabinet. The bottom wall 134 is formed with a large open area 138 located in front of the body when the door is in a closed position. This open area, in addition to providing ventilation and an escape for water, provides a passageway for the connector pipe 12 (which at its upper end is connected to the inlet 50 of tee 48) as well as for the accessory pipe 102 and the regulator vent 140 (FIG. 2b).

Returning to FIG. 4, it is seen that the head pipe 32 extends through a perforation or hole in the top located behind the mounting plane. The hole and pipe are sealed by means of a rubber grommet 142 and further sealed with a sealant to maintain the gas tight nature of the cabinet.

A rotatable latch 144 (FIG. 2b) is provided on the door for engaging a finger 146 on the right wall for securing the door in the closed position.

In view of the foregoing, it is apparent that the present invention provides a meter set which can be efficiently mass produced off-site and installed in a building in the early stages of its construction. The invention further minimizes the on-site time required of highly trained personnel. Specifically, the mass produced meter set may be provided as a prefabricated module to a builder which installs the set in its building. Personnel from the local gas utility need only make the final connection between the riser and the meter set. Because the meter is installed in the early phases of construction, there is a reduced need for adapting the meter set to the specific environment. Accordingly, the use of a preformed cast manifold is facilitated for connecting the meter to a head pipe and thus, to the building gas system.

In addition to the neater appearance of the plumbing associated with the meter, a cabinet is provided which the partially recessed within the wall of the building and harmoniously integrated into an exterior appearance of the building.

Although, the preferred embodiment of a meter set, including a particular construction of a cabinet and a manifold has been described herein, other constructions are possible. Various inventive aspects of the cabinet and manifold may be applied individually or in partial combination. It is therefore understood that, within the scope of the dependent claims, the invention may be practiced other than as specifically described.

What is claimed is:

1. A manifold for establishing communication between a gas meter and a building gas system, the manifold comprising:

a downward facing inlet port;

an upward facing outlet port above and behind the inlet port and connected thereto by a run;

a forward facing service port formed above the inlet port; and a mounting flange for mounting the manifold to a base surface.

2. A manifold for establishing communication between a gas meter and a building gas system, the manifold comprising:

a downward facing inlet port;

an upward facing outlet port above and behind the inlet port and connected thereto by a run;

a forward facing service port formed above the inlet port; and a mounting flange for mounting the manifold to a base surface,
      wherein the mounting flange is of elongate form and rearward facing below the primary outlet port and has left and right mounting holes adjacent left and right ends.

3. The manifold of claim 2 further comprising an accessory port.

4. The manifold of claim 2 wherein the manifold formed as an aluminum casting.

5. The manifold of claim 2 wherein the inlet port, outlet port and service port are internally threaded.

6. The manifold of claim 2 further comprising an externally threaded service port plug for selectively sealing the service port.

7. The manifold of claim 2 further comprising an annular, radially outward facing, lip about the service port.

8. A gas meter cabinet adapted for mounting within a wall of a building comprising:

a body having members defining top, bottom, left side, right side and rear walls interconnected in a gas-tight manner, and having a cabinet mounting feature defining a cabinet mounting plane forward of the rear wall for mounting the body at least partially recessed within a wall of a building and wherein the top wall has a perforation extending therethrough for accommodating a gas line to provide communication via the gas line through the body; and a door, coupled to the body, for selectively covering an opening at the front of the body.

9. The gas meter cabinet of claim 8 wherein the mounting feature is adapted for mounting the cabinet between adjacent studs of a building wall.

10. The gas meter cabinet of claim 9 wherein the mounting feature comprises a pair of vertical flanges, one said flange extending from each of said left and right walls.

11. The gas meter cabinet of claim 10 wherein each said flange has a flat rear face and has a plurality of holes for accommodating fasteners for securing the flange to respective ones of said adjacent studs.

12. The gas meter cabinet of claim 8 wherein the perforation is behind the mounting plane.

13. The gas meter cabinet of claim 12 wherein the rear wall includes meter mounting holes for mounting a gas meter within the cabinet.

14. The gas meter cabinet of claim 8 wherein the top wall extends forward of the mounting plane and extends over the door when the door is in a closed position.

15. The gas meter cabinet of claim 8 wherein when the door is in the closed position a gap is defined between the door and the bottom wall for accommodating an inlet line.

16. The gas meter cabinet of claim 8 wherein the door is formed with a viewing port aligned with an index of the gas meter and through which the index may be viewed.

17. The gas meter cabinet of claim 8 wherein the bottom wall has an inner surface which slopes downward from the rear wall.

18. The gas meter cabinet of claim 8 wherein each of the left and right walls is formed having a rear portion extending rearward from the mounting feature and a front portion extending forward of said mounting feature, said forward portion located laterally outboard of said rear portion.

19. The gas meter cabinet of claim 8 further comprising a gas meter within the cabinet.

20. The gas meter cabinet of claim 19 further comprising a pressure regulator connecting to the gas meter via a pipe.

21. The gas meter cabinet of claim 19 further comprising a manifold attached to one of the walls of the body.

22. The manifold of claim 2 wherein the outlet port is horizontally offset from the inlet port.

23. The manifold of claim 2 further comprising an accessory port branching off from the outlet port.

24. The manifold of claim 2 further comprising a service port branching off of the inlet port.

* * * * *